United States Patent
Lundberg et al.

(10) Patent No.: US 8,371,552 B2
(45) Date of Patent: Feb. 12, 2013

(54) SHIFT ACTUATOR VALVE HAVING A PRESSURE DEAD BAND

(75) Inventors: Philip C. Lundberg, Keego Harbor, MI (US); Bret M. Olson, Whitelake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 530 days.

(21) Appl. No.: 12/611,669

(22) Filed: Nov. 3, 2009

(65) Prior Publication Data

US 2010/0148099 A1 Jun. 17, 2010

Related U.S. Application Data

(60) Provisional application No. 61/121,746, filed on Dec. 11, 2008.

(51) Int. Cl.
*F16K 31/122* (2006.01)

(52) U.S. Cl. .............. 251/31; 91/415; 251/63.4

(58) Field of Classification Search .......... 251/31, 251/63.4; 91/415, 173; 92/62, 75; 74/364
See application file for complete search history.

(56) References Cited

U.S. PATENT DOCUMENTS

| | | | | |
|---|---|---|---|---|
| 1,612,007 A | * | 12/1926 | Furlong | 122/480 |
| 2,700,986 A | * | 2/1955 | Gunn | 137/596.16 |
| 2,934,306 A | * | 4/1960 | Stearns et al. | 251/28 |
| 3,673,926 A | * | 7/1972 | Mohri | 92/51 |
| 3,791,262 A | * | 2/1974 | Staehlin et al. | 92/52 |
| 5,125,326 A | * | 6/1992 | Sarcona | 92/62 |
| 5,483,796 A | * | 1/1996 | Ando | 60/560 |
| 5,669,265 A | * | 9/1997 | Adler | 74/335 |

* cited by examiner

*Primary Examiner* — Eric Keasel
*Assistant Examiner* — Time Aigbe

(57) ABSTRACT

A valve assembly having a pressure dead band includes a first valve or sleeve slidably disposed within a valve body. A second valve is partially slidably disposed within the first valve and partially slidably disposed in the valve body. A plurality of fluid passages communicate with the valve assembly and provide a first flow of hydraulic fluid and a second flow of hydraulic fluid. A lower threshold of the pressure dead band is defined by the pressure on the combination of the first area of the first valve and the first area of the second valve required to balance the resultant force developed on the second area of the second valve. An upper threshold of the pressure dead band is defined by the pressure on the first area of the second valve required to balance the resultant force developed on the second area of the second valve.

17 Claims, 5 Drawing Sheets

SHIFT ACTUATOR VALVE HAVING A PRESSURE DEAD BAND

FIELD

The invention relates generally to a shift actuator valve for a transmission, and more particularly to a shift actuator valve for a transmission having a sleeve and a valve that move independently relative to one another in order to provide a pressure dead band in which the sleeve and valve return to a center location. When used with a synchronizer, the pressure dead band will force the synchronizer to a neutral location.

BACKGROUND

The statements in this section merely provide background information related to the present disclosure and may or may not constitute prior art.

Typical automatic and dual clutch transmissions employ a hydraulic control system operable to perform various functions such as controlling various components within the transmission. Examples of these functions include controlling torque transmitting devices, cooling, lubrication, and the actuation of valve assemblies and components. The hydraulic control system typically includes a valve body having a plurality of valves located therein. These valves are connected via a plurality of fluid passages formed within the valve body and within various components of the transmission, such as shafts.

A pressurized hydraulic fluid is communicated through these fluid passages to the various valves within the control system. The valves are then selectively actuated to control the flow of the pressurized hydraulic fluid through the transmission. One type of valve found in dual clutch transmissions having synchronizer assemblies includes a shift actuator valve operable to mechanically move a shift fork in the synchronizer assembly in order to position a synchronizer between a neutral, or unengaged position, and at least one engaged position. In the neutral position, the synchronizer is not engaged with a gear. In the engaged position, the synchronizer is engaged with a gear. It is important that these shift valves have features that prevent unwanted engagement or disengagement of the synchronizer. One example of a feature that assures the shift valve is in the desired position is the use of one or more pressure or flow control solenoids and position sensors that provide feedback to control the actuator position.

While these shift valves are useful for their intended purpose, there is a constant desire to reduce the complexity of the control algorithm which returns the pistons or valves back to a neutral location, while maintaining robust and reliable operation. Accordingly, there is a need in the art for a shift valve assembly that achieves this goal while maintaining sealing and functionality within the control system and providing a tolerance in the range of pressures that actuate the shift valve, resulting in a simple and reliable control valve.

SUMMARY

A valve assembly having a pressure dead band is provided. In the example provided, the valve assembly includes a first valve or sleeve slidably disposed within a valve body. A second valve is partially slidably disposed within the first valve and partially slidably disposed in the valve body. The first and second valves are operable to move relative to one another. A plurality of fluid passages communicate with the valve assembly and provide a first flow of hydraulic fluid to one end of the valve assembly and a second flow of hydraulic fluid to another end of the valve assembly. The first flow of hydraulic fluid exerts a pressure on a first area of the first valve and on a first area of the second valve. The second flow of hydraulic fluid exerts a pressure on a second area of the second valve. A lower threshold of the pressure dead band is defined by the pressure on the combination of the first area of the first valve and the first area of the second valve required to balance the resultant force developed on the second area of the second valve by the second fluid flow. An upper threshold of the pressure dead band is defined by the pressure on the first area of the second valve required to balance the resultant force developed on the second area of the second valve by the second fluid flow when the first valve is restricted from movement.

In one example of the present invention, the second valve includes a pair of radially extending lands, and the first and second areas are located on the lands.

In another example of the present invention, the second valve includes one land, and the first area is located on the land, and the second area is located on an end of the second valve.

In yet another example of the present invention, the range of the pressure dead band is defined as the difference in pressures required to balance the forces developed on the valve assembly. For example, the range of the pressure dead band is defined as the difference in pressure acting on the second area of the second valve and the first area of the first valve and the first area of the second valve at the lower threshold and the pressure acting on the first area of the first valve and the first area of the second valve at the upper threshold.

In yet another example of the present invention, the valves are moved by a hydraulic fluid provided by a pressure control device, such as a solenoid.

Further objects, examples and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
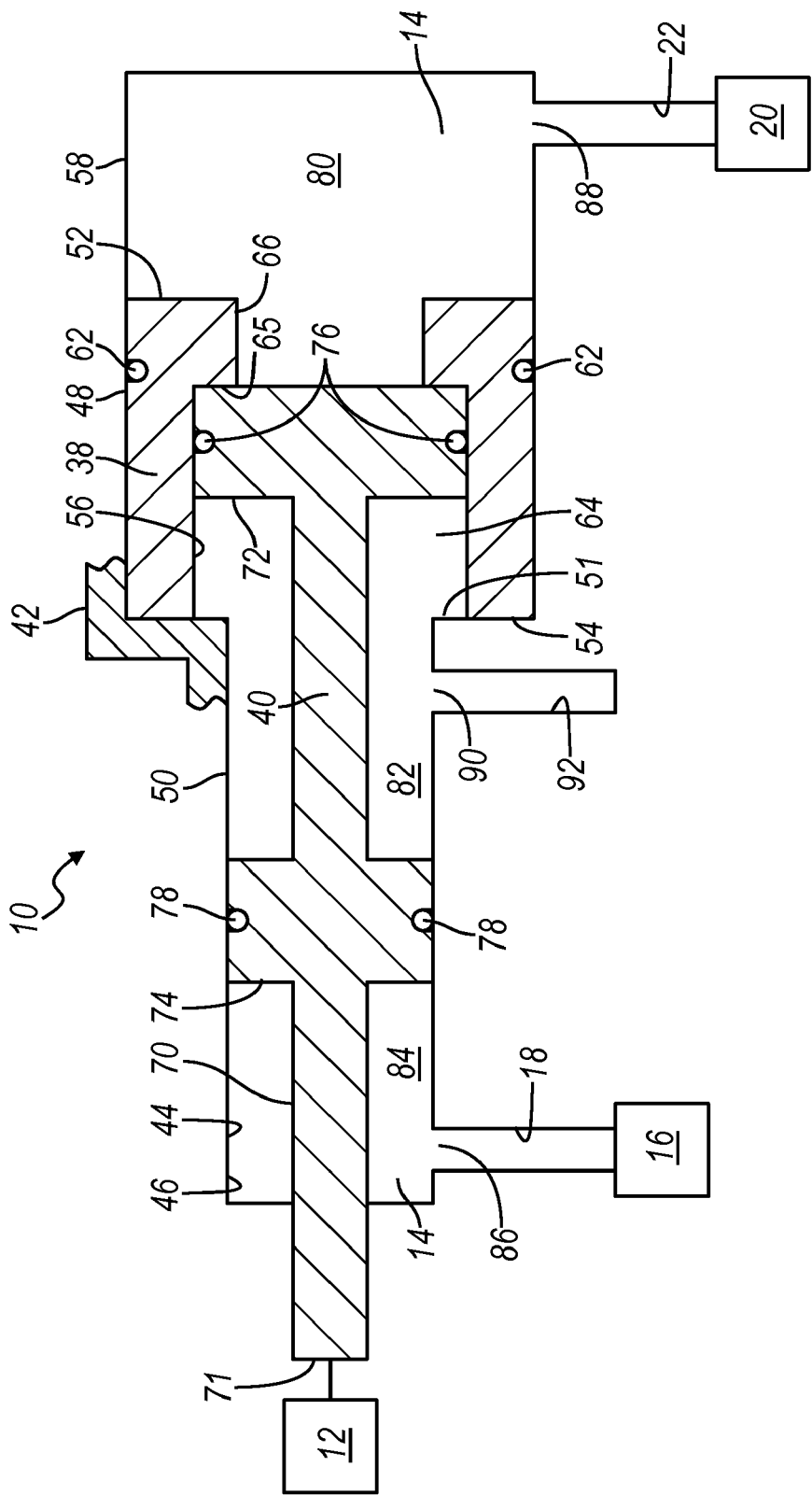
FIG. 1 is a schematic diagram of an embodiment of a shift actuator valve assembly according to the principles of the present invention in a first position.

With reference to FIG. 1, a shift actuator valve assembly for use in a transmission of a motor vehicle is illustrated schematically and generally indicated by reference number 10. The valve assembly 10 is operable to mechanically actuate or control a synchronizer assembly 12 within the transmission, as will be described in greater detail below. The synchronizer assembly 12 is preferably a double sided synchronizer that generally includes a shift fork (not shown) that is bi-directionally translated between two engaged positions and a neutral or disengaged position. In the two engaged positions, the synchronizer assembly 12 is engaged with a gear (not shown) and is operable to transmit torque therethrough while in the neutral position the synchronizer assembly 12 is not engaged with a gear and accordingly does not transmit torque therethrough.

The valve assembly 10 is actuated by varying the flow/pressure of a hydraulic fluid 14 to the valve assembly 10. For example, a pressurized hydraulic fluid source 16, such as a pump, accumulator or intermediary hydraulic control, communicates a first pressurized fluid flow of the hydraulic fluid 14 to the valve assembly 10 via a first fluid flow path 18. A pressure control device 20, such as a variable force solenoid or pressure valve, communicates a second pressurized fluid flow of the hydraulic fluid 14 to the valve assembly 10 via a second fluid flow path 22. The first and second fluid flow paths 18, 22 may take various forms, such as channels or passages formed in a valve body or other hydraulic system, and may have various lengths and branches without departing from the scope of the present invention.

The valve assembly 10 includes a first valve or sleeve 38 and a second valve 40 located within a valve body 42. The valves 38, 40 are operable to slide relative to the valve body 42 and relative to each other. For example, the valve body 42 includes an inner surface 44 that defines a bore 46. The bore 46 includes a first portion 48 and a second portion 50. The first portion 48 has a diameter that is greater than a diameter of the second portion 50. Accordingly, the inner surface 44 extends radially to form a stop surface 51 between the first portion 48 and the second portion 50. The stop surface 51 is used to control the movement of the first valve 38, as will be described in greater detail below. The first valve 38 is slidably located within the first portion 48 of the bore 46 and the second valve 40 is slidably located within the second portion 50 of the bore 46 as well as slidably located within the first valve 38, as will also be described in greater detail below. The valve body 42 is preferably formed as an integral component of the transmission.

The first valve 38 is, in the example provided, cylindrical and includes a first end 52, a second end 54 located opposite the first end 52, an inner surface 56, and an outer surface 58. The outer surface 58 is sealingly engaged to the inner surface 44 of the first portion 48 of the bore 46. In the example provided, the outer surface 58 is sealingly engaged to the inner surface 44 of the bore 46 by an o-ring seal 62, however, it should be appreciated that various other types of seals, including valve fits, may be employed without departing from the scope of the present invention. The inner surface 56 defines a space 64 within the first valve 38 that receives a portion of the second valve 40. The inner surface 56 further defines a step surface or end surface 65 located proximate the first end. An aperture 66 is located in the first end 52 and communicates between the space 64, and therefore the portion of the second valve 40 within the space 64, and the first end 52.

The second valve 40 is, in the example provided, a spool valve and includes a central body 70 that extends along a length of the bore 46. A distal end 71 of the central body 70 extends out from the valve body 42 and is in mechanical communication with the synchronizer assembly 12. A first land 72 and a second land 74 extend radially outward from the central body 70 within the bore 46. The first land 72 is located at an end of the central body 70 opposite that of the distal end 71. The first land 72 is located within the space 64 defined by the inner surface 56 of the first valve 38. The first land 72 is sealingly engaged to the inner surface 56 of the first valve 38. In the example provided, the first land 72 is sealingly engaged to the inner surface 56 of the first valve 38 by an o-ring seal 76, however, it should be appreciated that various other types of seals, including valve fits, may be employed without departing from the scope of the present invention. The second land 74 is located between the distal end 71 and the first land 72. The second land 74 is sealingly engaged to the inner surface 44 of the second portion 50 of the bore 46. In the example provided, the second land 74 is sealingly engaged to the inner surface 44 of the second portion 50 of the bore 46 by an o-ring seal 78, however, it should be appreciated that various other types of seals may be employed without departing from the scope of the present invention.

The first valve 38 and the second valve 40 cooperate to define a plurality of fluid chambers within the bore 46 having variable volumes upon translation of the first valve 38 and second valve 40. More specifically, the first end 52 of the first valve 38 and the first land 72 cooperate with the inner surface 44 of the first portion 48 of the bore 46 to define a first fluid chamber 80. The second end 54 of the first valve 38, the first land 72, and the second land 74 cooperate with the inner surface 44 of the first portion 48 of the bore 46 to define a second fluid chamber 82. Finally, the second land 74 and the inner surface 44 of the second portion 50 of the bore 46 cooperate to define a third fluid chamber 84.

Figure 2:
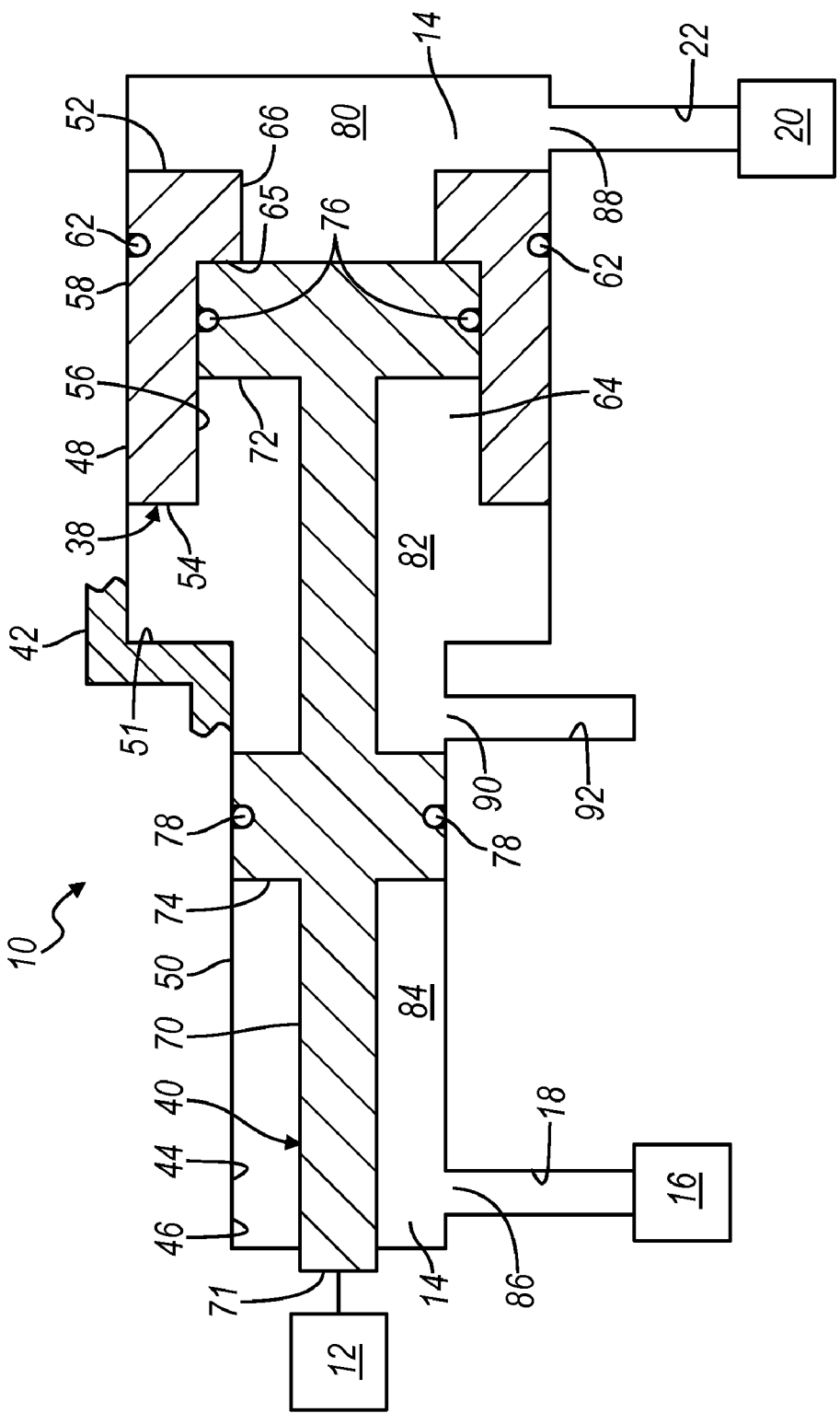
FIG. 2 is a schematic diagram of the shift actuator valve assembly according to the principles of the present invention in a second position.
Figure 3:
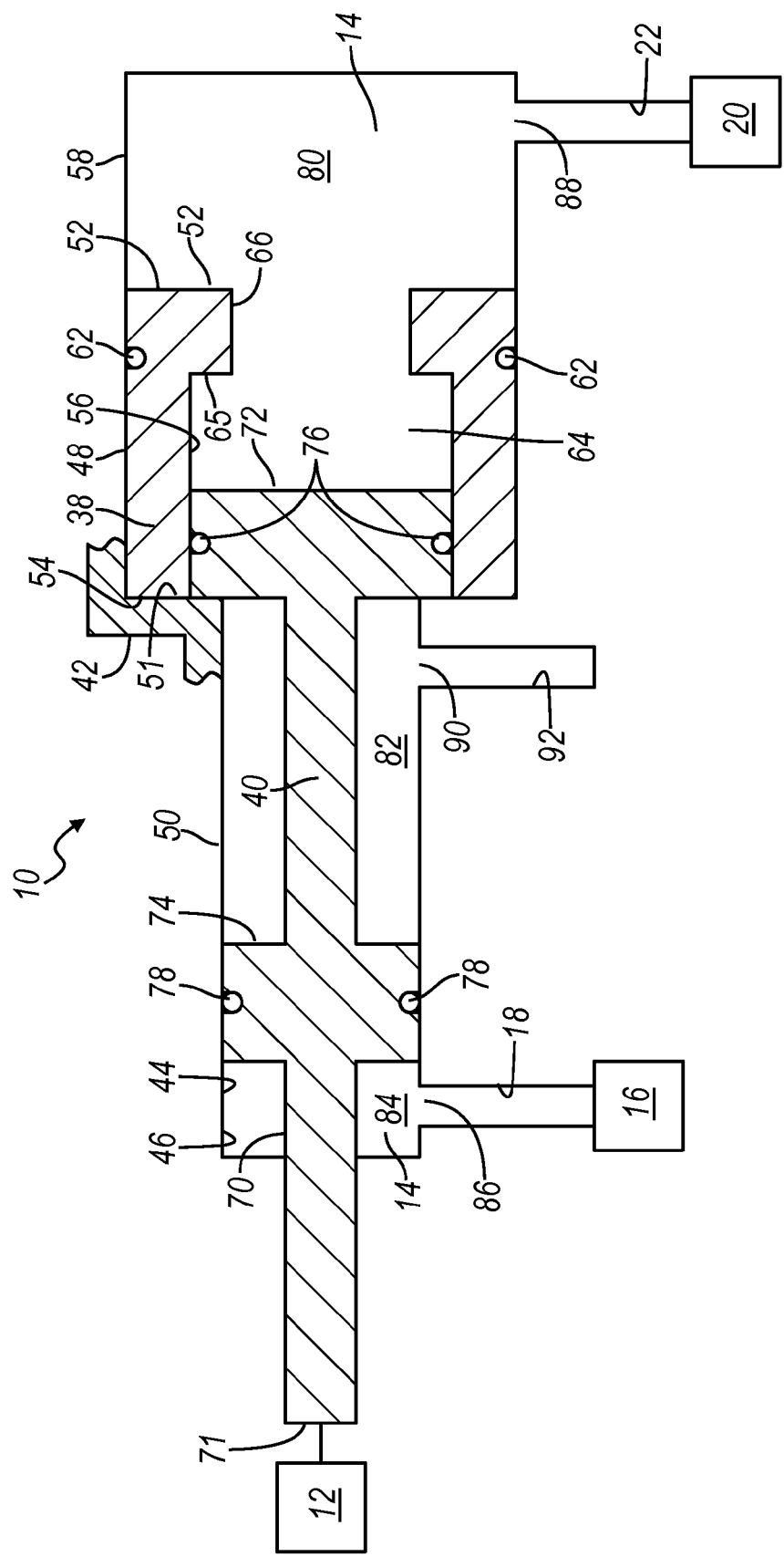
FIG. 3 is a schematic diagram of the shift actuator valve assembly according to the principles of the present invention in a third position.

The valves 38, 40 are moveable within the bore 46 between a first position or netural, shown in FIG. 1, a second position, shown in FIG. 2, and a third position, shown in FIG. 3.

The first land 72 has a surface area that is greater than a surface area of the second land 74. The difference between the force developed by the pressure on the surface area of the first end 52 of the first valve 38 and the force developed by the pressure on the surface contact area of the first land 72 creates a pressure dead band where a range of fluid pressures within the first fluid chamber 80 creates a neutral position of the second valve 40, and therefore a neutral in the synchronizer assembly 12, as will be described in greater detail below.

The valve body 42 further defines a plurality of ports that connect with the fluid flow paths 18, 22. In the example provided, the valve body 42 includes a first port 86 that communicates between the bore 46 and the first fluid flow path 18. The first port 86 is located at an end of the bore 46 proximate the distal end 71 of the second valve 40 and communicates with the third fluid chamber 84. A second port 88 communicates between the bore 46 and the second fluid flow path 22. The second port 88 is located at an end of the bore 46 proximate the first land 72 of the second valve 40 and communicates with the first fluid chamber 80. A third port or exhaust port 90 communicates between the bore 46 and an exhaust fluid flow path 92. The third port 90 is located between the first and second fluid ports 86, 88 and communicates with the second fluid chamber 82. Exhaust refers to low pressure or no back pressure. It should be appreciated that various other arrangements of fluid communication channels and ports may be employed without departing from the scope of the present invention.

The valves 38, 40 are moved between the plurality of positions shown in FIGS. 1-3 by regulation of the flow of hydraulic fluid to the first fluid chamber 80 via the pressure control device 20. More specifically, a first fluid flow of hydraulic fluid 14 having a constant pressure is provided to the third fluid chamber 84 via the first port 86 and first fluid flow path 18. This constant pressure of the hydraulic fluid 14 within the third fluid chamber 84 acts on the second land 74 and creates a first constant force on the second valve 40 towards the first valve 38. In order to position the synchronizer assembly 12 in a first engaged position, the pressure of the hydraulic fluid 14 delivered to the first fluid chamber 80 via the second inlet port 88 and second fluid flow path 22 is reduced below a first threshold value. As the pressure drops below this threshold, the force acting on the second land 74 exceeds the force acting on the first valve 38 and the first land 72 moves and contacts the step surface 65 and the valves 38, 40 move together such that the volume of the first fluid chamber 80 decreases. The valves 38, 40 move to the first engaged position, shown in FIG. 2, which in turn moves the synchronizer assembly 12 to a first engaged position.

In order to return to the neutral position, the pressure of the hydraulic fluid delivered to the first fluid chamber 80 via the pressure control device 20 is increased such that the force acting on the first valve 38 and the first land 72 exceeds the force acting on the second land 74. The valves 38, 40 will move back to the neutral position shown in FIG. 1 until such time as the first valve 38 is stopped from further movement when the second end 54 contacts the stop surface 51. At this point, the effective area that the hydraulic fluid 14 acts upon in the first fluid chamber 80 decreases to the surface area of the land 72 since the first valve 38 can no longer move. Accordingly, the pressure of the hydraulic fluid 14 within the first fluid chamber 80 must increase to a second threshold that is greater than the first threshold in order to further move the second valve 40. The difference between the first threshold and the second threshold defines the dead band or range of pressures that create the neutral position of the second valve 40 and therefore the synchronizer assembly 12. More specifically, the pressure dead band is defined as the pressure required to balance the force developed by pressurizing the second land 74. The lower threshold applies to the pressure required to balance the force on the second land 74 using a force developed on both the surface areas of the first end 52 of the first valve 38 and the first land 72. The upper threshold applies to the pressure required to balance the force on the second land 74 using a force developed on the first land 72 alone. So long as the pressure delivered via the pressure control device 20 is within the pressure dead band, the second valve 38 will remain in the neutral position shown in FIG. 1. By creating a pressure dead band, the valve assembly 10 improves safety by creating a tolerance of pressures that will result in the neutral state.

To place the synchronizer assembly 12 in a second engaged position, the pressure delivered to the first fluid chamber 80 is increased above the second threshold. Accordingly, the force acting on the first land 72 exceeds the force acting on the second land 74, and the second valve 40 moves independently of the first valve 40 and decreases the volume of the third fluid chamber 84. The second valve 40 is in the second engaged position when the first land 72 contacts the stop surface 51, as shown in FIG. 3. In this second engaged position, the synchronizer assembly 12 is moved to the second engaged position by the second valve 38.

Figure 4:
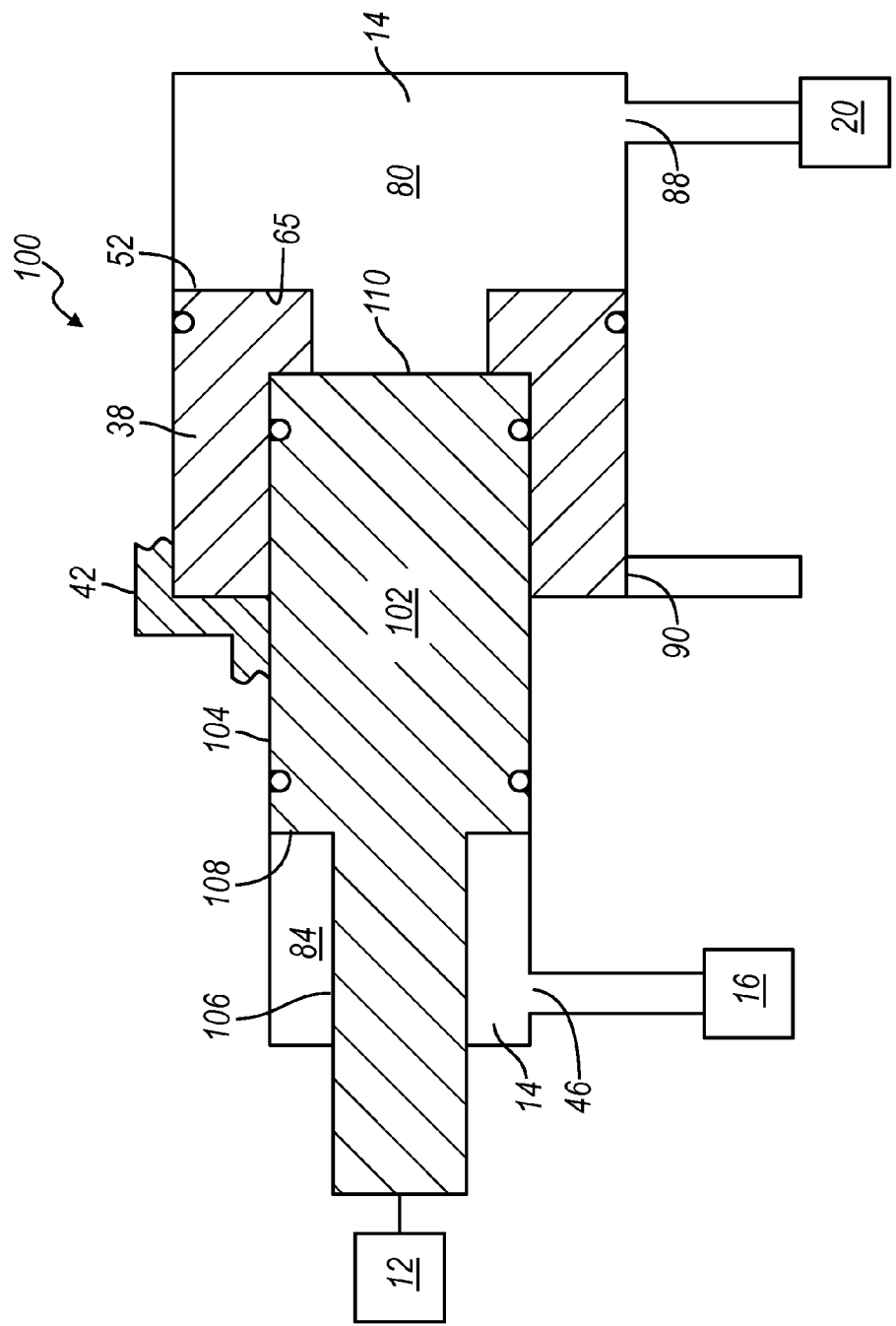
FIG. 4 is a schematic diagram of another embodiment of a shift actuator valve assembly according to the principles of the present invention in a first position.

Turning now to FIG. 4, another embodiment of a valve assembly according to the principles of the present invention is indicated by reference number 100. The valve assembly 100 is substantially similar to the valve assembly 10 shown in FIGS. 1-3 and accordingly like components are referred to with like reference numbers. The valve assembly 100 includes a second valve 102 having a first portion 104 and a second portion 106. The first portion 104 has a diameter greater than a diameter of the second portion 106. A radially extending surface 108 is located between the first portion 104 and the second portion 106. The hydraulic fluid 14 in the third fluid chamber 84 acts directly on the radially extending surface 108 and the hydraulic fluid within the first fluid chamber 80 acts directly on the first end 52 of the first valve 38 and on a end 110 of the valve 102. More specifically, the pressure dead band is defined as the pressure required to balance the force developed by pressurizing the surface 108. The lower threshold applies to the pressure required to balance the force on the surface 108 using a force developed on both the surface areas of the first end 52 of the first valve 38 and the end 110. The upper threshold applies to the pressure required to balance the force on the second land 74 using a force developed on the end 110 alone.

Figure 5:
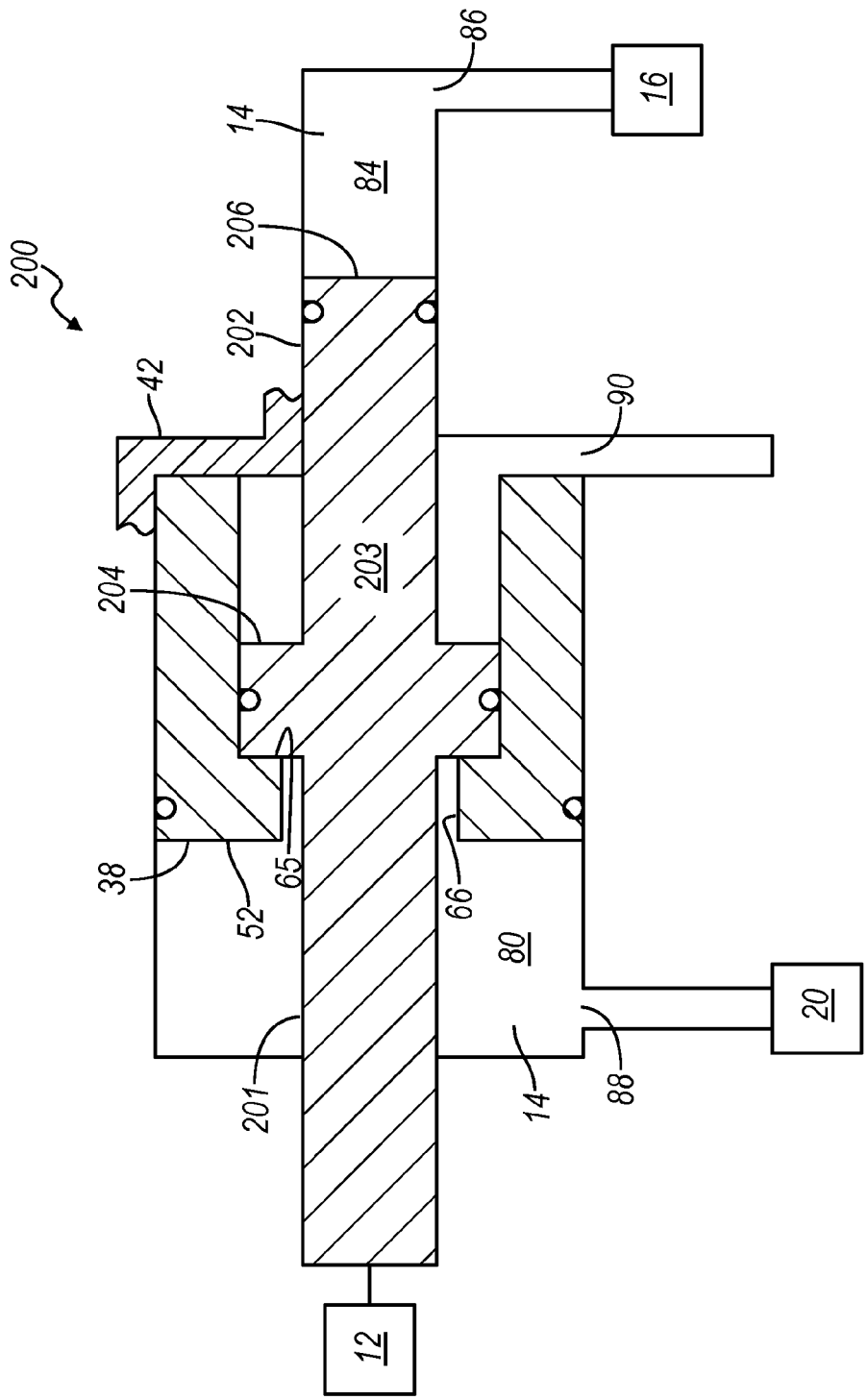
FIG. 5 is a schematic diagram of yet another embodiment of a shift actuator valve assembly according to the principles of the present invention in a first position.

With reference to FIG. 5, another embodiment of a valve assembly according to the principles of the present invention is indicated by reference number 200. The valve assembly 200 is substantially similar to the valve assembly 10 shown in FIGS. 1-3 and accordingly like components are referred to with like reference numbers. However, the valve 40 and the valve body 42 are flipped horizontally in the valve assembly 200. The valve assembly 200 includes a second valve 202 having a central body 203 and a radially extending land 204. The land 204 is substantially similar to the land 72 in the valve assembly 10. The hydraulic fluid 14 in the third fluid chamber 84 acts directly on an end 206 of the second valve 202. Moreover, the second valve 202 extends through the aperture 66 of the first valve 38 to connect with the synchronizer assembly 12. Accordingly, the aperture 66 has a diameter greater than a diameter of the central body 201 of the valve 202 such that the hydraulic fluid 14 may pass between the first valve 38 and contact the land 204 of the second valve 202. The pressure dead band is defined by the difference between a surface area of the first end 52 of the first valve 38 and the surface area of the land 204. More specifically, the pressure dead band is defined as the pressure required to balance the force developed by pressurizing the end 206. The lower threshold applies to the pressure required to balance the force on the end 206 using a force developed on both the surface areas of the first end 52 of the first valve 38 and the land 204. The upper threshold applies to the pressure required to balance the force on the end 206 using a force developed on the land 204 alone.

The description of the invention is merely exemplary in nature and variations that do not depart from the gist of the invention are intended to be within the scope of the invention. Such variations are not to be regarded as a departure from the spirit and scope of the invention.

We claim the following:

1. A valve assembly for actuating a synchronizer, the synchronizer moveable between a first engaged state, a second engaged state, and a neutral state, the valve assembly comprising:
   a valve body having a stop;
   a sleeve slidably disposed within the valve body and moveable between a first position wherein the sleeve is in contact with the stop and a second position wherein the sleeve is not in contact with the stop;
   a valve slidably disposed within the valve body and within the sleeve, the valve moveable between a first position that places the synchronizer in the first engaged state, a second position that places the synchronizer in the second engaged state, and a third position that places the synchronizer in the neutral state, wherein the valve is in contact with the stop when in the first position;

a first force acting on the valve to bias the valve towards the second position; and a source of pressurized hydraulic fluid in communication with the valve and with the sleeve, wherein the source of pressurized hydraulic fluid is operable to communicate pressurized hydraulic fluid to contact the valve and the sleeve to generate a second force acting on the valve and a third force acting on the sleeve, wherein the sleeve and the valve are each in the first position when each of the second force and the third force is greater than the first force, wherein the sleeve and the valve are each in the second position when each of the second force and the third force is less than the first force, and wherein the sleeve is in the first position when the third force is greater than the first force and the valve is in the third position when the second force is less than the first force.

2. The valve assembly of claim 1 wherein the first force is due to pressurized hydraulic fluid in contact with the valve communicated from a second source of pressurized hydraulic fluid.

3. The valve assembly of claim 1 wherein the sleeve includes a first end and a second end and defines a bore having a step surface, and wherein the sleeve includes an opening in the second end that communicates with the bore.

4. The valve assembly of claim 3 wherein the valve includes a first end and a second end, wherein the first force acts on the first end of the valve and the second force acts on the second end of the valve.

5. The valve assembly of claim 4 wherein the second end of the valve is disposed within the bore of the sleeve, and wherein the second end of the valve contacts the step surface of the bore when the valve is in the second position and the sleeve is in the second position and when the valve is in the third position and the sleeve is in the first position.

6. The valve assembly of claim 5 wherein the pressurized hydraulic fluid communicates through the opening in the sleeve to act on the second end of the valve.

7. The valve assembly of claim 6 wherein the first end of the valve is a radially extended land sealingly engaged to the valve body and the second end of the valve is a radially extended land sealingly engaged with the bore of the sleeve.

8. The valve assembly of claim 1 wherein the source of pressurized hydraulic fluid is a variable force solenoid.

9. A valve assembly for actuating a synchronizer, the synchronizer moveable between a first engaged state, a second engaged state, and a neutral state, the valve assembly comprising:

a valve body having a stop;

a sleeve slidably disposed within the valve body, the sleeve defining a bore, wherein the sleeve is moveable between a first position wherein the sleeve is in contact with the stop and a second position;

a valve slidably disposed within the valve body and within the bore of the sleeve, wherein the valve is sealingly engaged to the valve body and the sleeve and the valve is operatively associated with the synchronizer, wherein the valve includes a first valve end and a second valve end opposite the first valve end, and wherein the valve is moveable between a first position that places the synchronizer in the first engaged state, a second position that places the synchronizer in the second engaged state, and a third position that places the synchronizer in the neutral state, wherein the valve contacts the stop when in the first position;

a first source of pressurized hydraulic fluid in communication with the first valve end, wherein the first source of pressurized hydraulic fluid is operable to provide pressurized hydraulic fluid in contact with the first valve end, and wherein the pressurized hydraulic fluid in contact with the first valve end creates a first force acting on the first valve end to bias the valve and the sleeve towards the first position; and a second source of pressurized hydraulic fluid in communication with the second valve end and with the sleeve, wherein the second source of pressurized hydraulic fluid is operable to communicate pressurized hydraulic fluid to contact the second valve end and the sleeve to create a second force on the second valve end and a third force on the sleeve, wherein the sleeve and the valve are each in the first position when the second force and the third force combined are greater than the first force, wherein the sleeve is in the first position and the valve is in the third position when the second force and the third force combined are greater than the first force but the second force is less than or equal to the first force, and wherein the valve is in the first position when the second force is greater than the first force.

10. The valve assembly of claim 9 wherein the sleeve includes a first end and a second end and defines a bore having a step surface, and wherein the sleeve includes an opening in the second end that communicates with the bore.

11. The valve assembly of claim 10 wherein the step surface is located proximate the opening.

12. The valve assembly of claim 11 wherein the second valve end contacts the step surface of the sleeve when the valve is in the first position and the third position.

13. The valve assembly of claim 12 wherein the second valve end is disposed within the bore of the sleeve.

14. The valve assembly of claim 13 wherein the pressurized hydraulic fluid communicates through the opening in the sleeve to act on the second valve end.

15. The valve assembly of claim 14 wherein the first valve end is a radially extended surface of the valve and the second valve end is a radially extended surface of the valve located opposite the first valve end.

16. The valve assembly of claim 9 wherein the second source of pressurized hydraulic fluid is a variable force solenoid.

17. The valve assembly of claim 9 wherein the stop prevents the sleeve from moving in a direction towards the first valve end.

* * * * *